33-236. XR 3,035,477 SR

CROSS REFERENCE SEARCH ROOM

May 22, 1962 M. TEN BOSCH ETAL 3,035,477

APPARATUS FOR STABILIZING OPTICAL SIGHTING SYSTEMS

Filed Feb. 1, 1950 11 Sheets-Sheet 1

INVENTORS
MAURITS TEN BOSCH
PAUL H. LANG
BY Henry L. Shenier
ATTORNEY

APPARATUS FOR STABILIZING OPTICAL SIGHTING SYSTEMS

Filed Feb. 1, 1950 11 Sheets-Sheet 2

INVENTORS
MAURITS TEN BOSCH
PAUL H. LANG
BY Harry L. Shenier
ATTORNEY

INVENTORS
MAURITS TEN BOSCH
PAUL H. LANG
BY Henry L. Shenier
ATTORNEY

APPARATUS FOR STABILIZING OPTICAL SIGHTING SYSTEMS

Filed Feb. 1, 1950 11 Sheets-Sheet 4

INVENTORS
MAURITS TEN BOSCH
PAUL H. LANG
BY Henry L. Shenier
ATTORNEY

APPARATUS FOR STABILIZING OPTICAL SIGHTING SYSTEMS

INVENTORS
MAURITS TEN BOSCH
PAUL H. LANG
BY Henry L. Shenier
ATTORNEY

INVENTORS
MAURITS TEN BOSCH
PAUL H. LANG
BY Henry L. Shenier
ATTORNEY

INVENTORS
MAURITS TEN BOSCH
PAUL H. LANG
BY Henry L. Shenier
ATTORNEY

APPARATUS FOR STABILIZING OPTICAL SIGHTING SYSTEMS

Filed Feb. 1, 1950 11 Sheets-Sheet 8

INVENTORS
MAURITS TEN BOSCH
PAUL H. LANG
BY [signature]
ATTORNEY

INVENTORS
MAURITS TEN BOSCH
PAUL H. LANG
BY Henry L. Shenier
ATTORNEY

INVENTORS
MAURITS TEN BOSCH
PAUL H. LANG
BY Henry L. Shenier
ATTORNEY

May 22, 1962 M. TEN BOSCH ET AL 3,035,477

APPARATUS FOR STABILIZING OPTICAL SIGHTING SYSTEMS

Filed Feb. 1, 1950 11 Sheets-Sheet 11

INVENTORS
MAURITS TEN BOSCH
PAUL H. LANG
BY Henry L. Shenier
ATTORNEY 3,035,477

APPARATUS FOR STABILIZING OPTICAL SIGHTING SYSTEMS

Maurits Ten Bosch, White Plains, and Paul H. Lang, Katonah, N.Y., assignors, by mesne assignments, to United Aircraft Corporation, East Hartford, Conn., a corporation of Delaware Filed Feb. 1, 1950, Ser. No. 141,798
17 Claims. (Cl. 88—1)

Our invention relates to apparatus for stabilizing optical sighting systems.

Stabilized optical systems are used for fire control directors, gunsights, bombsights and the like. It has been suggested to support a sighting system on a stable platform which is maintained in the plane of the horizon by a gyroscopic control system so that irrespective of the movements of a vessel or aircraft a line of sight may be directed at a target with comparative ease. The problem of stabilizing a platform for a sight becomes awkward and complicated when the sight is a heavy piece of equipment. This method has a marked disadvantage in aircraft where weight saving is an important factor. Then too, if the stabilized platform is not sufficiently large to support an operator, the eye piece of the sight will constantly move with respect to the operator, making its use awkward and inconvenient.

A solution to the problem is to mount the sight, which may be a periscope in the case of an aircraft, along a predetermined axis of the aircraft, say a vertical axis when the airplane is in horizontal flight, and provide for stabilization of the line of sight by controlling optical elements along a cross-level and level axis. The cross-level axis may be defined as an axis perpendicular to the periscope axis and the level axis may be defined as an axis perpendicular to the cross-level axis and perpendicular to the line of sight. A gyroscopic sensitive element may be employed to control prisms to achieve stabilization along the level and cross-level axes. In this manner if the aircraft rolls or pitches the line of sight will not be thrown off due to the compensating control system. To direct the line of sight, we propose to provide an azimuth gyroscope to orient the line of sight in a fixed direction with respect to space and to compensate by the gyroscopic element not only for yawing of the aircraft from its course but also for the change in direction of the line of sight resulting from the translation of the plane toward or away from the target. If it be attempted to rotate the periscope or other optical element from a controlling azimuth gyroscope, an error will be introduced. The line of sight will be along the true direction only when the axis of the periscope coincides with a true vertical direction. Whenever the airplane rolls or pitches, the axis of the periscope will be inclined from the true vertical direction. Let the angle of inclination between the axis of the periscope and the true vertical direction be $\delta$. Let the angle between north and the line of sight, that is, the true direction of the line of sight, be $\phi$. Assuming now that we were to attempt to orient the line of sight by rotating the periscope having a fixed axis relative to the aircraft, the indicated direction as pointed out above would always vary from the true direction except when the aircraft was flying in the plane of the horizon. Let this indicated direction be $\phi'$. The following relations appear:

$$\sin \phi' = \sin \phi \cos \delta \tag{1}$$

$$\tan \phi' = \frac{\sin \phi'}{\cos \phi'} \tag{2}$$

Substituting the value of $\phi'$ as given by (1) in (2), we obtain $$\tan \phi' = \frac{\sin \phi \cos \delta}{\cos \phi'} \tag{3}$$

The plane of the horizon and the plane normal to the axis of the periscope will intersect along a common line. Since $\cos \phi$ is represented by a distance along this line and $\cos \phi'$ will be represented by the same distance along the common line of intersection $\cos \phi$ will always equal $\cos \phi'$.

Substituting $\cos \phi$ for $\cos \phi'$ in (3), we obtain $$\tan \phi' = \frac{\sin \phi}{\cos \phi} \cos \delta \tag{4}$$

It will be observed from the foregoing that whenever the plane normal to the periscope axis coincides with the plane of the horizon that $\delta$ becomes zero and the true direction will coincide with the indicated direction, that is, angle $\phi$ will equal angle $\phi'$.

In all other conditions the indicated direction will be in error from the true direction by a function of the cosine of the angle of inclination between the true vertical and the plane of the aircraft, that is, the plane normal to the axis of the periscope with the periscope fixed to the plane and free to pitch and roll therewith.

One object of our invention is to provide apparatus for stabilizing optical systems in which a periscope or other optical system is mounted on a vessel or aircraft for bodily movement therewith and rotatable in azimuth, in which a line of sight to a target will be maintained irrespective of maneuvering of the aircraft or irrespective of rolling and pitching of the aircraft.

Another object of our invention is to provide apparatus for stabilizing optical sighting systems by means of fixed gyroscopes along level and cross-level axes with respect to the line of sight, in which the line of sight does not normally correspond to the direction of movement of the aircraft.

Another object of our invention is to provide apparatus for stabilizing optical sighting systems in which optical elements are maintained along level and cross-level axes from a gyroscope without reorienting the gyroscope as the line of sight changes.

Another object of our invention is to provide apparatus for stabilizing optical sighting systems in which an azimuth gyroscope will control the orientation of the line of sight of a periscope or other optical sighting system carried by an aircraft, to indicate the true direction irrespective of rolling or pitching of the aircraft.

Another object of our invention is to provide a stabilized optical sighting system into which the elevation angle may be set directly.

Another object of our invention is to provide apparatus for stabilizing optical sighting systems in which a line of sight may be established from a moving aircraft to a stationary target and maintained irrespective of maneuvers of the aircraft both in attitude and direction as well as in altitude.

Other and further objects will appear from the following description.

In general our invention contemplates the provision of an optical sighting system, which for purposes of illustration and not be way of limitation, will be described as a periscope mounted on an aircraft. The periscope is carried by the aircraft proper with its axis extending vertically when the aircraft is in normal level of flight. The periscope is mounted for rotation with respect to the aircraft. A gimbal ring is carried by the aircraft and pivotally mounted along a fore-and-aft axis. This ring will be referred to as the "roll" ring. A second gimbal ring is carried by the first gimbal ring for rotation about an axis extending transversely of the aircraft. This ring will be referred to as the "pitch" ring. A ring is rotatably carried by the pitch ring. This ring will be referred to as the "level" ring. The level ring carries a fourth ring which is pivoted to it around the level axis. This ring will be referred to as the "cross-level" ring. The cross-level ring is pivoted to the periscope tube for rotation with respect thereto around the cross-level axis. The periscope tube is rotated by an azimuth servomotor. The azimuth servomotor is controlled by a synchronous device which takes its signal from the level ring. The roll ring is stabilized by a control gyroscope about a fore-and aft axis. The pitch ring is stabilized about a transverse axis by the gyroscope. In this manner the rotary level ring will be stabilized in a plane parallel to the plane of the horizon. The rotation of the periscope tube is transmitted by the coupling axes of the universal connection to rotate the level ring. Since the level ring is stabilized in a plane parallel to the horizon, the servomotor will act until a true direction is reproduced as projected to a horizontal plane, and in this manner automatic compensation is made for the function of the cosine of the angle between the periscope axis and the true vertical, and the line of sight will always be oriented to the true direction by the azimuth gyroscope irrespective of pitching or rolling of the aircraft. The line of sight of the periscope is directed to the target through a pair of prisms. One of the prisms is controlled from the cross-level ring through a compensating linkage to stabilize the line of sight about the cross-level axis. The other of the prisms is controlled from the level ring to stabilize it about the level axis by means of a linkage through which the sight angle can be introduced. The sight angle is generated by a computer combined with azimuth and then transmitted through an appropriate transmission to control the depression of the line of sight from the horizontal direction to the target. Since the prism assembly is mounted on the periscope which is oriented in azimuth, azimuth is automatically removed from the combined function so that the prism is controlled by sight angle only. The construction is such that the level correction is introduced through the same prism which adjusts the line of sight for the sight angle, so that the common prism is subject to two controls, one for level and one for sight angle. The entire prism assembly is oriented in azimuth and in this manner the line of sight is kept on the target irrespective of the maneuvering of the aircraft. The optical system includes a reticule having a pair of cross wires. We provide an appropriate transmission system which is operated as a function of sight angle, level angle, and azimuth, to provide an input to a torque amplifier, the output of which drives a reticule tube which is mounted for rotation with respect to the periscope tube so that the cross wires on the reticule will always line up with the level and cross-level axes of the line of sight as it varies due to translation of the aircraft and to maneuvering of the aircraft. In this manner the bombardier or fire control man will get a true picture of the target with respect to the line of sight irrespective of maneuvering of the plane either in altitude, in course, in rolling, or in pitching. The effect will be to provide a line of sight and a pair of crosshairs which are apparently stationary along the line of sight to the target.

In the accompanying drawings which form part of the instant specification and which are to be read in conjunction therewith, and in which like reference numerals are used to designate like parts in the various views.

Figure 11:
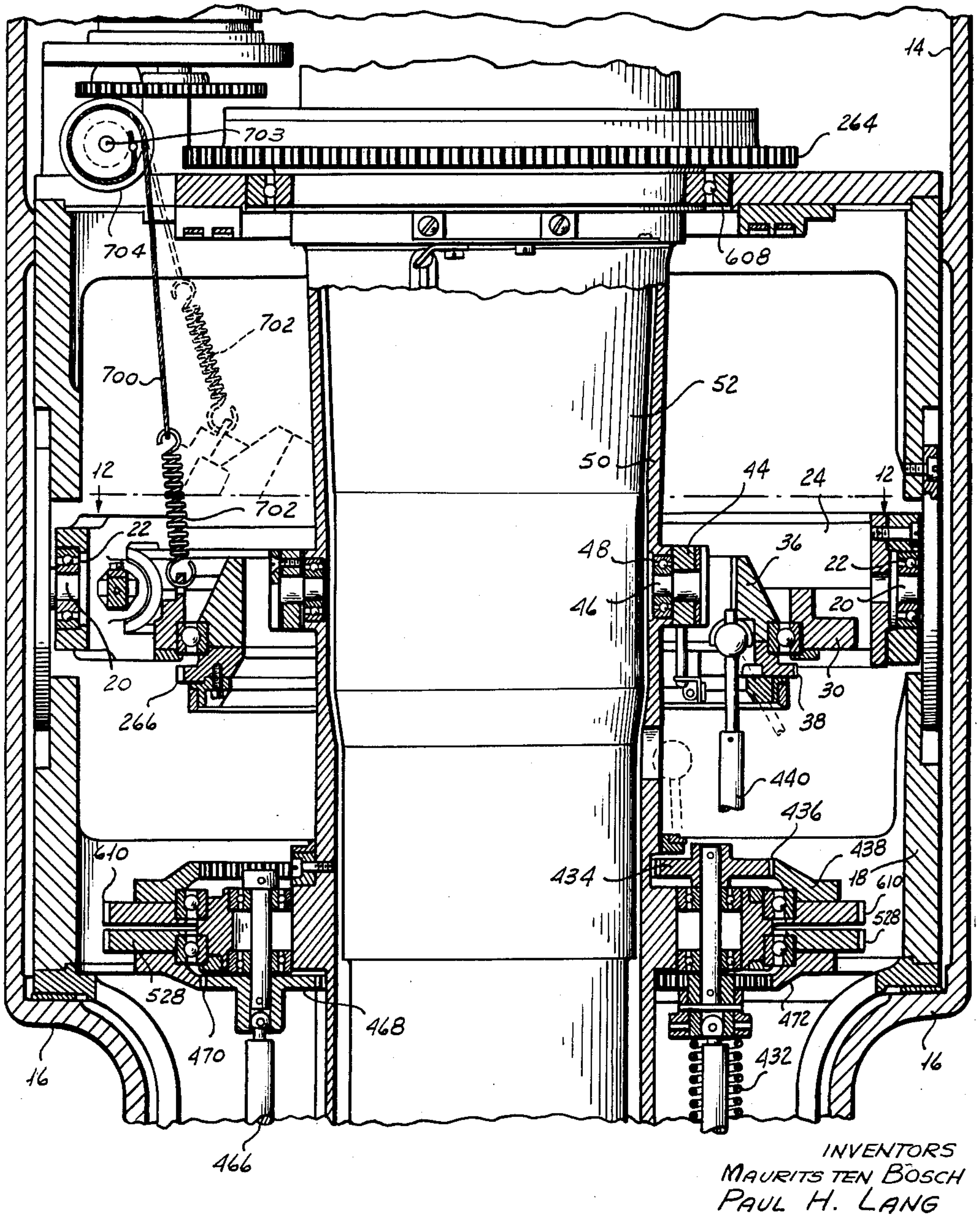
FIG. 11 is a sectional view of a portion of the instrument through the roll ring, the pitch ring, the level ring, and the cross-level ring, viewed along the roll axis with the cross-level axis oriented to coincide with the roll axis, showing adjacent parts above and below the level ring suspension.
Figure 12:
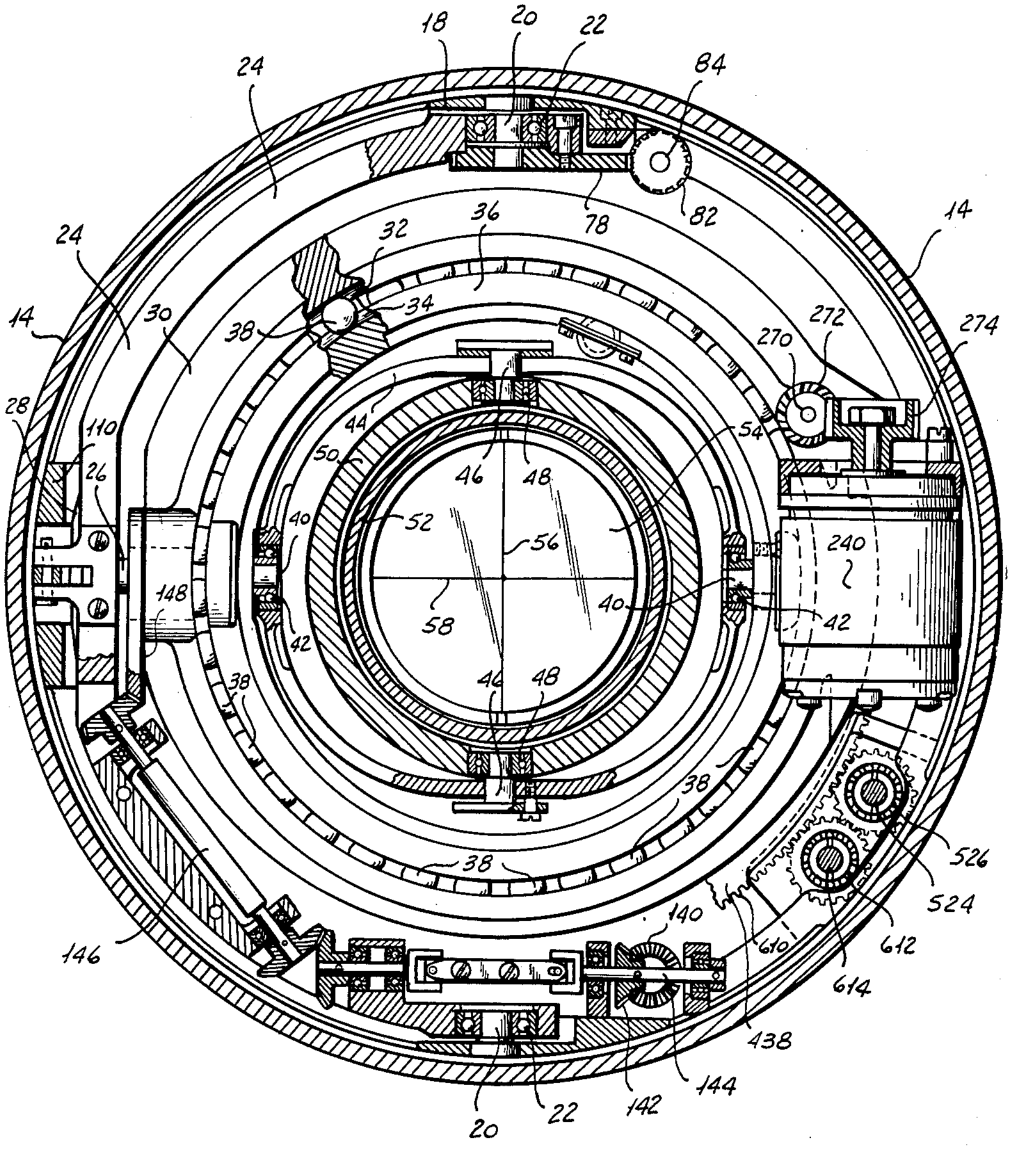
FIG. 12 is a sectional plan view taken along the line 12—12 of FIG. 11, and rotated through 90° so that the pitch and level axes extend horizontally and the roll and cross-level axes extend vertically.

Referring first to FIGS. 11 and 12, the periscope assembly is positioned in a casing 14 formed with an integral flange 16. The flange 16 supports a ring 18 and the ring is formed with a pair of trunnions 20 carrying suitable ball bearings 22 around which is pivotally mounted the roll ring 24 for rotation about the roll axis. In practice this ring takes the form of a fork or half ring. The roll ring in turn, as can be seen by reference to FIGURE 12, carries a bearing 28 in which is lodged a shaft 26 carried by the pitch ring 30 mounted for movement on the roll ring around an axis 90° from the support of the roll ring. The pitch ring is formed along its inner periphery with a race 32 adapted to cooperate with a race 34 formed in the stabilized level ring 36. A plurality of balls 38 are positioned between the races and serve to couple the level ring 36 with the pitch ring 30. The level ring 36 carries a pair of pins 40 supporting a pair of bearings 42 which couple the level ring 36 to the cross-level ring 44 to permit the level ring to rotate about the level axis. The cross-level ring 44 carries a pair of pins 46 which support a pair of ball bearings 48 positioned along the cross-level axis extending at right angles to the level axis. A ring 50 is formed integrally with the periscope tube and is pivotally connected by the bearings 48 to permit rotation of the cross-level ring 44 around the cross-level axis.

A reticule tube 52 is rotatably supported within the periscope tube 50 and carries a reticule 54 formed with a pair of crosshairs 56 and 58. The crosshair 56 is aligned along the cross-level axis and the crosshair 58 is aligned along the level axis.

Figure 1:
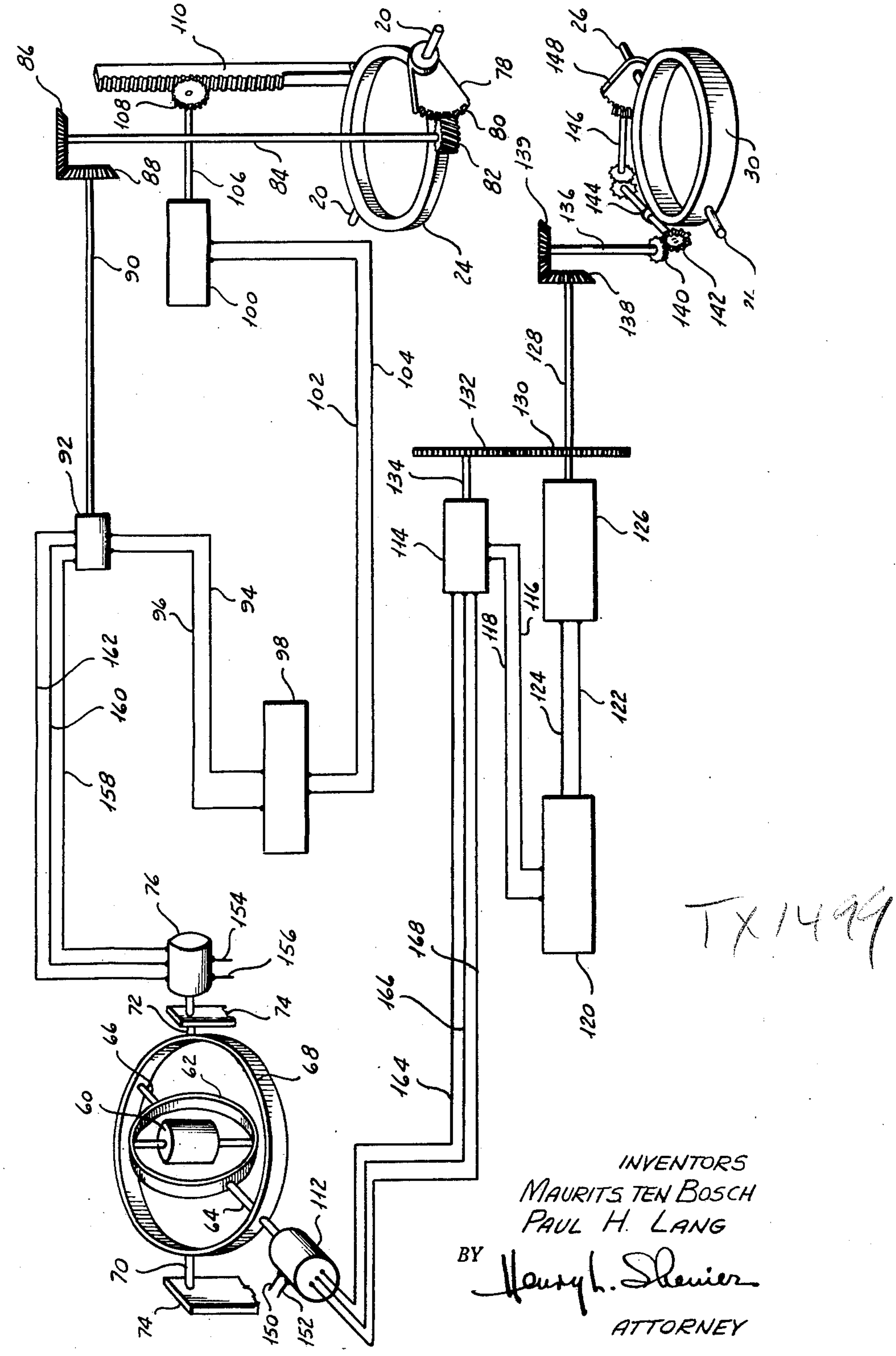
FIG. 1 is a diagrammatic view showing the flight gyroscope having a vertical spin axis and the control system for the pitch and roll rings whereby the level ring carrying the rotatable true azimuth gear is stabilized in a horizontal plane.

Referring now to FIG. 1, a flight gyroscope 60 having a vertical spin axis is mounted to spin in a housing 62 which is pivoted about a pair of trunnions 64 and 66 along the pitch axis of the aircraft. The trunnions are carried by a gimbal ring 68 mounted for rotation on a pair of trunnions 70 and 72 for rotation about the roll axis of the airplane and are carried by any suitable support 74 secured to the aircraft. As the aircraft maneuvers around the roll axis a position signal is generated in the roll synchro 76. The roll ring 24 whose trunnions 20 are parallel to trunnions 70 and 72 carries a segment 78 secured thereto for rotation therewith about the roll trunnions 20. It is formed with high pitch helical gear teeth 80 meshing with a helical gear pinion 82 secured to a shaft 84 for rotation therewith. The arrangement is such that the position of the roll ring is reflected by the position of the shaft 84. This shaft carries a gear 86 which meshes with a gear 88 which is secured to a shaft 90 of the armature of a second roll synchro 92. The difference in position between the roll gimbal ring 68 of the flight gyroscope and the position of the roll ring 24 will be sensed by the difference of the armatures of the roll synchro 76 and the roll synchro 92 and will produce a signal which is fed by conductors 94 and 96 to an amplifier 98. The output of the amplifier controls a roll servomotor 100 through conductors 102 and 104. The output of the roll servomotor rotates a shaft 106 which carries a gear 108 for rotation therewith. This gear meshes with a rack 110 which is pivotally secured to the roll ring 24 at a point 90° from the axis of the trunnions 20. As the servomotor 100 is adapted to rotate the roll ring around the roll axis, the rotation of the roll ring will position the armature of the roll synchro 92 to reduce the signal being impressed upon the amplifier 98, and when the position of the roll ring is agreeable to the position of the roll gimbal 68 the signal will be zero. In this manner, as the aircraft rolls the roll ring 24 will always be kept in the plane of the horizon around the roll axis as determined by the gimbal 68 of the flight gyroscope. As the airplane pitches the armature of the pitch synchro 112 will move relative to the armature of the second pitch synchro 114. The difference in armature positions will generate a signal which is impressed by conductors 116 and 118 upon an amplifier 120, the output of which through conductors 122 and 124, controls a pitch servomotor 126. The servomotor 126 rotates the shaft 128 to which is secured a gear 130 meshing with a gear 132 which is in turn carried by a shaft 134 of the armature of the synchro 114. When this armature is in a position agreeable to the position of the armature of the pitch synchro 112 no signal is produced. As the aircraft maneuvers about the pitch axis the gyroscope housing will remain stationary in space producing a relative rotation of the armature of the pitch synchro 112, the stator of which is carried by the aircraft. A difference in position between the armature of pitch synchro 114 and the armature of pitch synchro 112 produces a signal which operates the servomotor 126 to rotate the armature of the pitch synchro 114 to bring it to a position agreeable to the relative position of the armature of the pitch synchro 112. The rotation of shaft 128 is transmitted to shaft 136 through gears 138 and 139. The gear 140 meshes with a transmission system comprising shafts 144 and 146 and appropriate intermeshing gears to rotate a segment 148 which is secured to the pitch ring 30 to rotate this ring about its trunnions 26 so that the pitch ring will be maintained in a plane parallel to the plane of horizon by action of the gyroscope and the system just described.

A single-phase alternating current is impressed upon the synchro 112 through conductors 150 and 152 and upon synchro 76 through conductors 154 and 156. This current passes through the windings of the two-pole single-phase rotors. The stators of the roll synchros 76 and 92 are Y-wound and interconnected by conductors 158, 160, and 162. The pitch synchros 112 and 114 similarly have Y-wound stators interconnected by conductors 164, 166, and 168.

Figure 2:
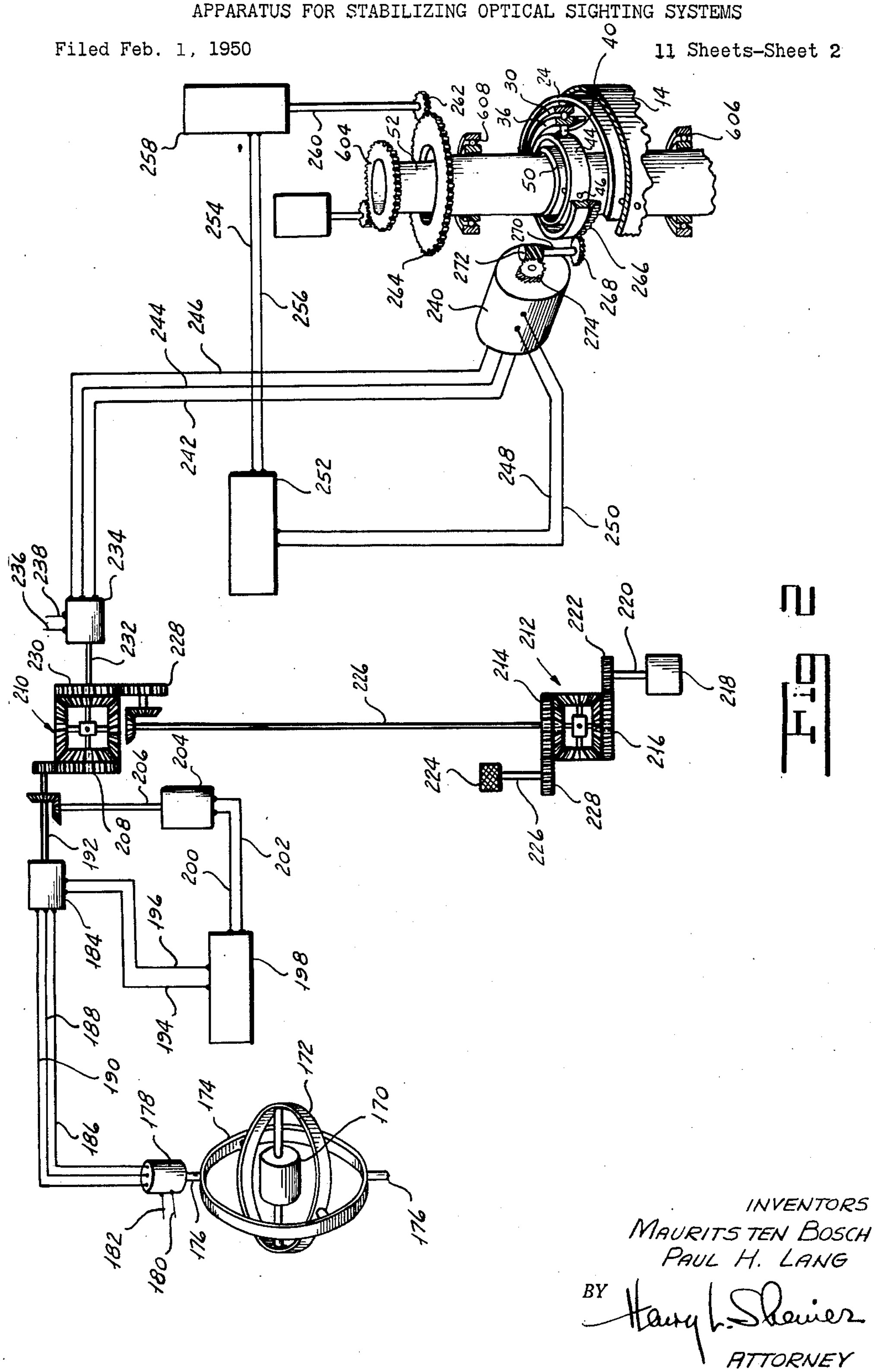
FIG. 2 is a diagrammatic view showing the azimuth gyroscope and the control system for orienting the periscope tube in the true direction.

Referring now to FIG. 2, an azimuth gyroscope having a horizontal rotor 170 is mounted for rotation in a housing 172 carried in a Cardan ring 174. The Cardan ring is mounted for rotation about a vertical axis indicated by shafts 176, so that as the airplane maneuvers around the vertical or yaw axis the rotor of the azimuth synchro 178 will remain stationary in space so that its stator will move relative to the rotor. A single phase alternating current is impressed upon the two-pole rotor through conductors 180 and 182. A second azimuth synchro 184 has a Y-wound stator which is connected to the Y-wound stator of the synchro 178 by conductors 186, 188, and 190. The rotor of synchro 184 is connected to a shaft 192 which represents the heading of the aircraft. As this heading changes, the relative position of the rotor of synchro 178 will move with respect to its stator and a signal will be generated in the rotor of the synchro 184. This signal is impressed by conductors 194 and 196 upon an amplifier 198, the output of which through conductors 200 and 202 controls a servomotor 204 which drives shaft 192 through shaft 206 to position the rotor of synchro 184 to nullify the position signal. The rotation of shaft 192 rotates one side gear 208 of a differential indicated generally by the reference numeral 210. A second differential indicated generally by the reference numeral 212 has a pair of side gears 214 and 216. Let us assume that the aircraft is flying due north and that the target is on the starboard bow of the craft. The line of sight, therefore, initially will make an angle between the course of the aircraft and the direction of the target. As the aircraft approaches the target this angle will become greater as a function of the speed of the aircraft. A suitable rate computer 218 drives the side gear 216 of the differential through shaft 220 and gear 222.

In order to bring the line of sight to the target, it will be necessary to slue the periscope in azimuth. A displacement knob 224 turns gear 228 through shaft 226. This gear meshes with the other side gear 214 of the differential 212, and hence rotates shaft 226 rotating gear 228 and driving the second side gear 230 of the differential 210. This positions the rotor of synchro 234 to cause the periscope to rotate about a vertical axis to bring the line of sight on the target. The rate computer 218 will continue to feed a correction through the side gear 230 of the differential 210 so that all rotation of the periscope is represented by the rotation of shaft 232 which is connected to the rotor of the azimuth synchro 234. A single-phase alternating current is impressed upon this rotor through conductors 236 and 238. The stator of synchro 234 which is Y-wound is connected to a similar Y-wound stator of synchro 240 by conductors 242, 244, and 246. The signal generated in the rotor of synchro 240 is impressed by conductors 248 and 250 upon an amplifier 252, the output of which is impressed by conductors 254 and 256 upon an azimuth servomotor 258. The azimuth servomotor drives shaft 260 to which is secured for rotation therewith a pinion 262 which meshes with an azimuth drive gear 264 secured to the periscope tube 50. The rotation of the periscope tube 50 will rotate the cross-level ring 44 through trunnions 46 and the level ring 36 through trunnions 40. The level ring is provided with an integral gear 266 which meshes with a pinion 268 secured to shaft 270 carrying a worm 272 meshing with a worm pinion 274 secured to the rotor of synchro 240. The output signal of the rotor of synchro 240 is impressed by conductors 250 and 248 upon the amplifier 252 as pointed out above. It will be observed that the rotation of the periscope tube 50 is controlled from the level ring 266 thus introducing the correction for the function of the cosine of the angle of inclination between the true vertical and the axis of the periscope which is fixed to and rocks with the aircraft. The vertical axis of the periscope furthermore is parallel to the vertical axis of the aircraft.

In this manner we orient the periscope tube to the line of sight irrespective of changes of course of the aircraft, irrespective of translation of the aircraft, and irrespective of rolling or pitching of the aircraft. By means of the displacement knob 224 we are enabled manually to orient the line of sight to a given target.

Figure 3:
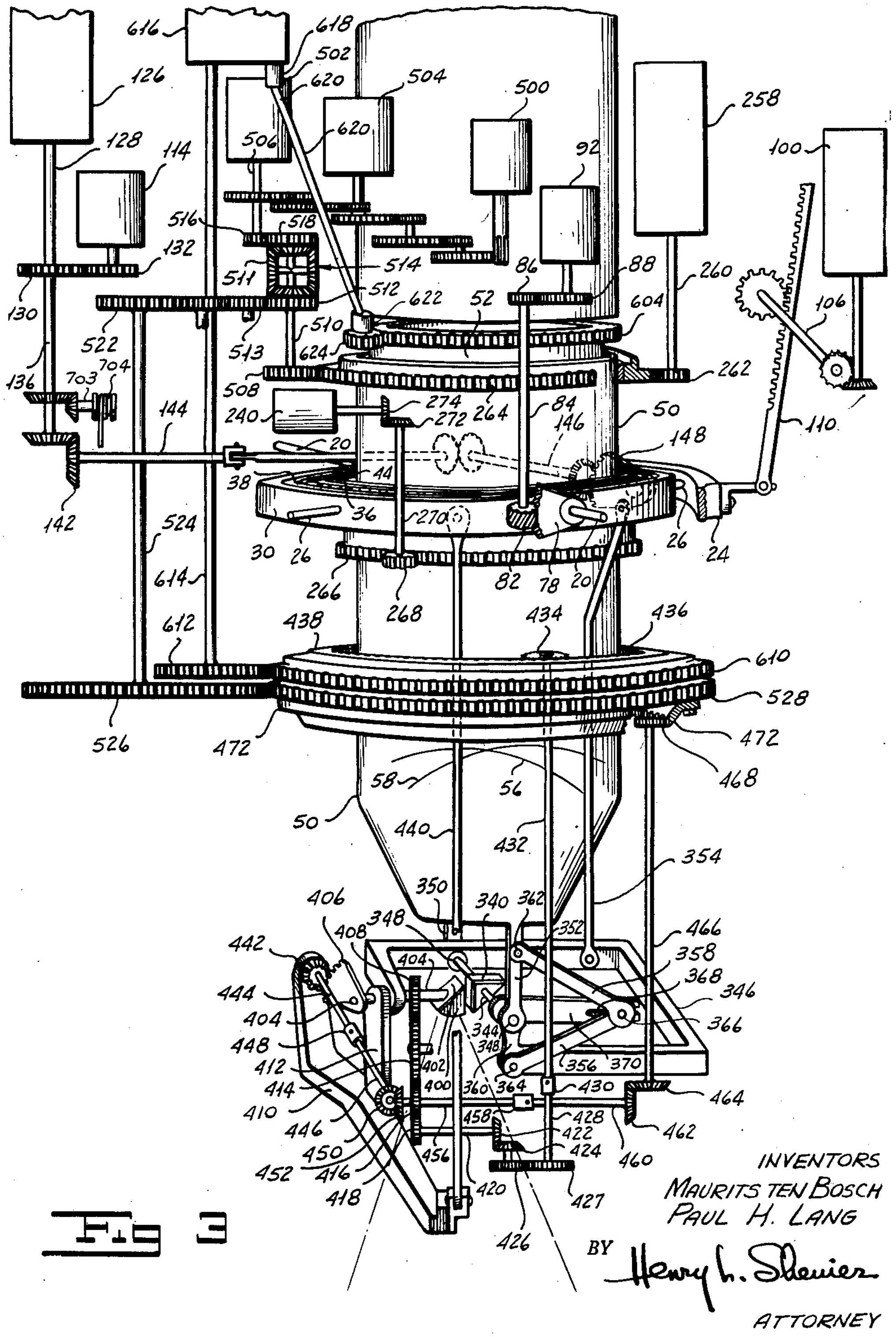
FIG. 3 is a diagrammatic view showing the relationship of the parts in one embodiment of the apparatus of our invention capable of carrying out our invention.

The line of sight is directed vertically along the axis of the periscope tube 50 and is deflected through a right angle by a cross-level prism 340. The prism is mounted for rotation about the cross-level axis in a carrier 342 provided with a pair of trunnions 344. The carrier is mounted for pivotal movement about the cross-level axis in arms 350 and 352 depending from the periscope tube 50. A cross-level push rod 354 is pivotally connected at its lower end to the frame 346 and at its upper end to the cross-level ring 44 in a parallel motion linkage such that the plane of frame 346 is maintained parallel to the plane of the cross-level ring 44. The frame trunnions 348 are in alignment with the cross-level ring bearings 48 but spaced directly below them. As the periscope tube rotates, the frame 346 will rotate. As the cross-level ring rocks about the cross-level axis the frame 346 will rotate about its axis which is parallel to the cross-level axis. Due to the fact that the angle of refraction of the light rays out of the cross-level prism 340 is equal to the angle of incidence of the light rays entering the prism, a rotation of the prism with the frame 346 would result in a deflection of the line of sight through twice the angle of rotation of the prism. Accordingly, I rotate the prism 340 independently of the frame 346 through an angle halving linkage comprising links 356 and 358 and arm 370. Link 358 is pivoted to the depending arm 352. A crank 360 formed with the frame 346 is pivoted to the lower end of depending arm 352 around the cross-level axis trunnions 348. Link 358 is pivoted at its upper end to the depending arm 352 around pivot pin 362. The other end of link 358 is pivoted to pin 366 to which one end of link 356 is likewise pivoted. The pin 366 is lodged in slot 368 formed in an arm 370 secured to the carrier of prism 340 so that rotation of arm 370 will rotate the prism. The other end of link 356 is pivoted at pivot pin 364 to the lower end of the crank 360. The distance between pivot pin 362 and trunnions 348 of the stationary depending arm is equal to the distance between the axis of trunnions 348 and the axis of pivot pin 364 along the crank 360. The link 358 is equal in length to the length of link 356. As the frame 346 rotates about the cross-level axis, the crank 360 will rotate pulling the link 356 and causing the pivot pin 366 to move, thus rotating the arm 370 through half the angle of rotation of the crank 360 which is equal to the rotation of the frame 346. Accordingly, rotation of the frame 346 about the cross-level axis will rotate the prism 340 about the cross-level axis through half the angle of rotation of the frame 346. The line of sight emerging from prism 340 enters prism 400 and is deflected downwardly. Prism 400 is mounted in a carrier 402 secured to a shaft 404 mounted for rotation in the frame 346 along the level axis. The shaft 404 has secured thereto for rotation therewith a gear segment 406 and a gear segment 408. A bracket 410 is pivoted about shaft 404 by means of an integral arm 412 rotating on suitable bearings, shown in FIG. 10. The gear 408 meshes with an idler gear 414 which in turn meshes with a second idler gear 416 which drives a gear 418 secured to a shaft 420, as can readily be seen by reference to FIG. 3. The shaft 420 transmits rotation of shaft 404 through gears 422, 424, 426 and 427 to a shaft 428 which is provided with a suitable universal joint 430 to transmit rotation of shaft 428 to shaft 432, the upper end of which is provided with a pinion 434 meshing with the internal teeth 436 of a ring gear 438. The outer end of bracket 410 is connected to the lower end of a level push rod 440, the upper end of which is connected to the level ring 36. The arrangement is such that the push rod constitutes a parallel motion linkage maintaining the bracket 410 parallel to the level ring as the level ring rotates about the level axis. The axis of shaft 404 is parallel to the level axis but is disposed below it. The bracket 410 carries a pinion 442 which meshes with the gear segment 406. The pinion 442 is secured to a shaft 444 for rotation therewith. The shaft 444 is connected to a shaft 446 by a universal joint 448. The end of shaft 446 carries a bevel gear 450 which meshes with a bevel gear 452 secured to a shaft 456. This shaft is connected by universal joint 458 to a shaft 460 carrying a bevel gear 462 which meshes with bevel gear 464 secured to the lower end of shaft 466, the upper end of which carries a pinion 468 meshing with the internal teeth 470 of a ring gear 472 shown in FIGURE 6. Assuming for the moment that the gear train just described is stationary, the pinion 442 will be stationary. As the aircraft rolls about the level axis, the level push rod 440 will rock the bracket 410 about the level axis thus rotating the gear segment 406 which is engaged therewith and rotating the level prism 400 about the level axis.

Since the aircraft is at an altitude above the target, the line of sight must be depressed from the horizontal plane parallel to the horizon in which the aircraft is flying and in which the stabilization described above is being performed. This angle is known as the sight angle and it will vary as a function of the altitude of the plane and of the distance on the ground vertically below the aircraft to the target. Since the aircraft may maneuver in altitude and since the distance between the aircraft and the target is varying, we provide means for constantly feeding the sight angle to the prism 400 so that the line of sight will not be deflected due to changes in altitude of the aircraft or due to translation of the target. A sight angle computer which forms no part of the instant invention comprises a sight angle motor 500 and sight angle computing elements within housings 502 and 504, the output of which is represented by the rotation of shaft 506. The position of shaft 506 will represent the correct sight angle through which the line of sight must be depressed. The elements just described are stationary with respect to the aircraft. The prism 400 is being rotated through a sight angle as described above. The rotation of the periscope is effected through the pinion 262 carried by the azimuth servomotor and ring gear 264 which is carried by the upper end of the periscope tube 50. A pinion 508 meshes with the ring gear 264 so that it will rotate as a function of azimuth. The pinion 508 is secured to a shaft 510 rotating the differential cross gears 511 of a differential indicated generally by the reference numeral 514. The lower end of shaft 506 carries a pinion 516 which meshes with the other side gear 518 of the differential 514. The output of differential 514 represented by the rotation of side gear 512 rotates idler gear 513 and drives gear 522 secured to a shaft 524, the lower end of which carries a gear 526 meshing with the external gear 528 of the ring gear 472 with the internal teeth of which the pinion 468 carried by shaft 466 is engaged. Since shaft 466 is carried around in azimuth with the periscope tube, it will be rotated during such rotation through a negative azimuth angle. Accordingly, only sight angle is fed downwardly through shaft 466 through the transmission comprising gear 464, gear 462, shaft 460, universal joint 458, shaft 456, bevel gear 452, bevel gear 450, shaft 446, universal joint 448, shaft 444, pinion 442 to gear segment 406, thus rotating the prism 400 through the sight angle. It will be observed that as the frame 346 rotates the azimuth is automatically removed from the combined function so that only the function of sight angle will rotate the prism 400. The foregoing construction enables us to maintain the line of sight on the target about the level axis irrespective of maneuvers of the aircraft about the level axis and irrespective of the varying sight angle. The change in the sight angle and maneuvering of the aircraft about the level axis will cause an apparent rotary displacement of the target with respect to the crosshairs 56 and 58 carried by the reticule. An observer looking through the optical system will note this apparent rotation due to the fact that the optical axis is being rotated by the rotation of the prism 400 around the level axis. In order to prevent this we stabilize the reticule so that the crosshair 58 is always parallel to the level axis and the crosshair 56 is always parallel to the cross-level axis. This is accomplished by driving the reticule tube as a function of azimuth, level and sight angle.

We have seen that the rotation of the level prism 400 is caused by rotation about the level axis and by sight angle. The gear segment 408 which is secured to the shaft 404 will rotate with the prism as level and sight angle. This rotation is transmitted through the transmission comprising gear 414, gear 416, gear 418, shaft 420, gear 422, gear 424, gear 426, gear 427, shaft 428, universal joint 430, shaft 432, and pinion 434 which meshes with the internal teeth 436 of the rotary ring gear 438. As pointed out above, when the periscope tube rotated, shaft 466 was carried around with it, thus removing the azimuth function through which the ring gear 528 was rotated. The sight angle and level is introduced to ring gear 438 by the rotation of shaft 432 and the azimuth is introduced by the translation of the shaft 432 and its pinion 434 by the rotation of the periscope tube, so that ring gear 438 will rotate as a combined function of sight angle, level and azimuth.

Figure 4:
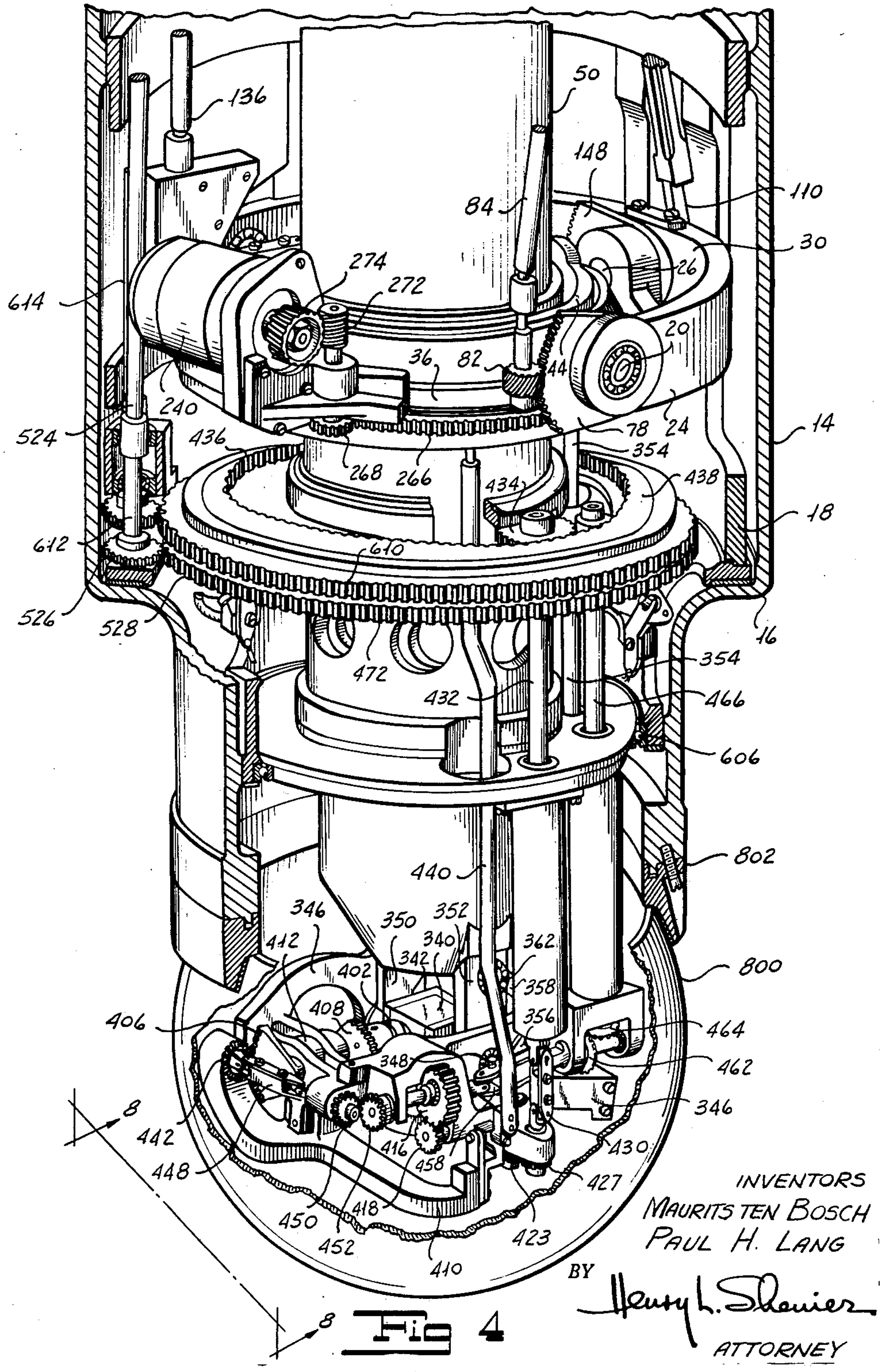
FIG. 4 is a perspective view with parts broken away of the apparatus for stabilizing optical sighting systems, viewed along the cross-level axis of the lower portion of the assembly.
Figure 5:
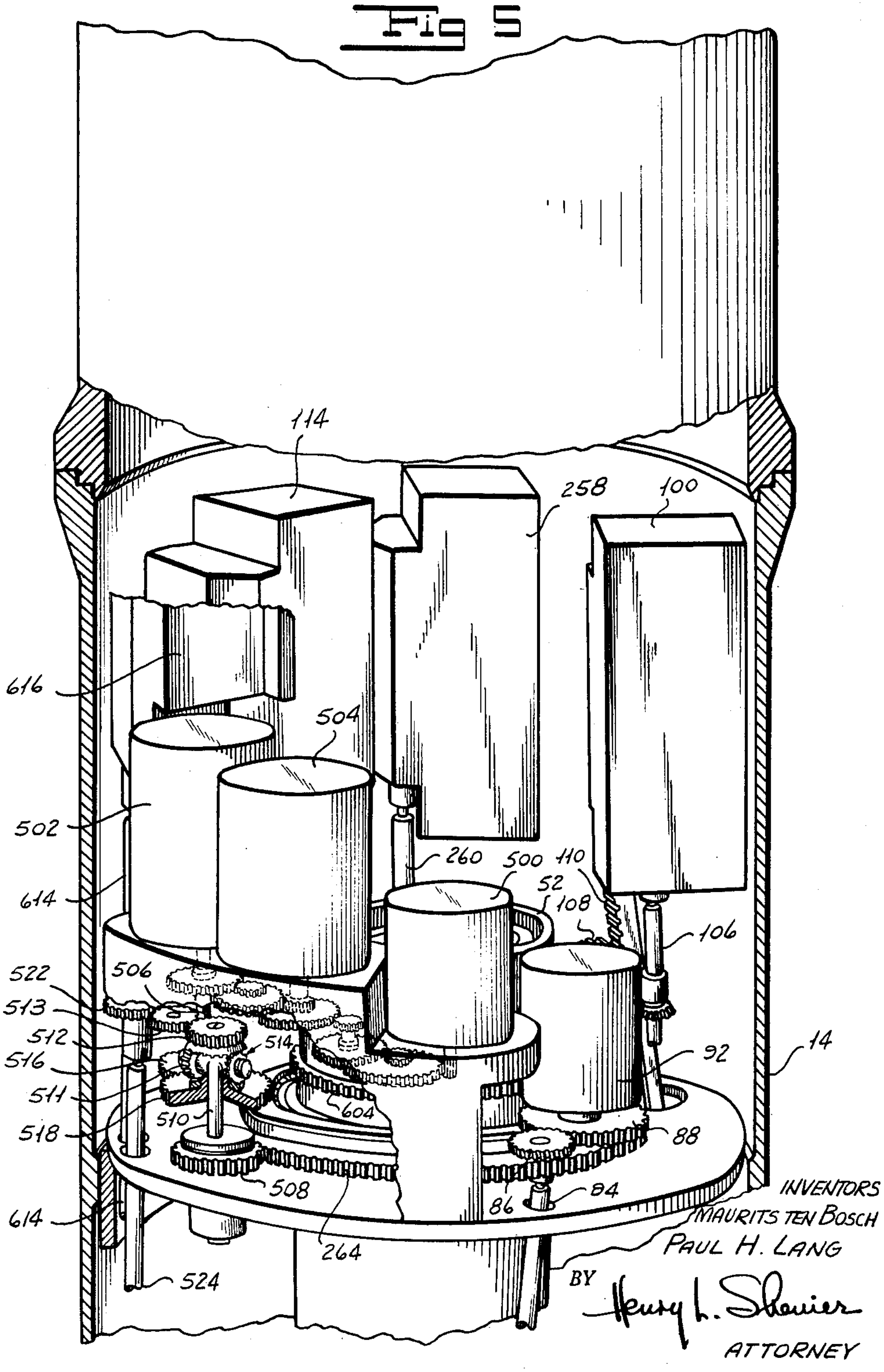
FIG. 5 is a perspective view of the upper portion of the assembly viewed in the direction of FIG. 4.
Figure 6:
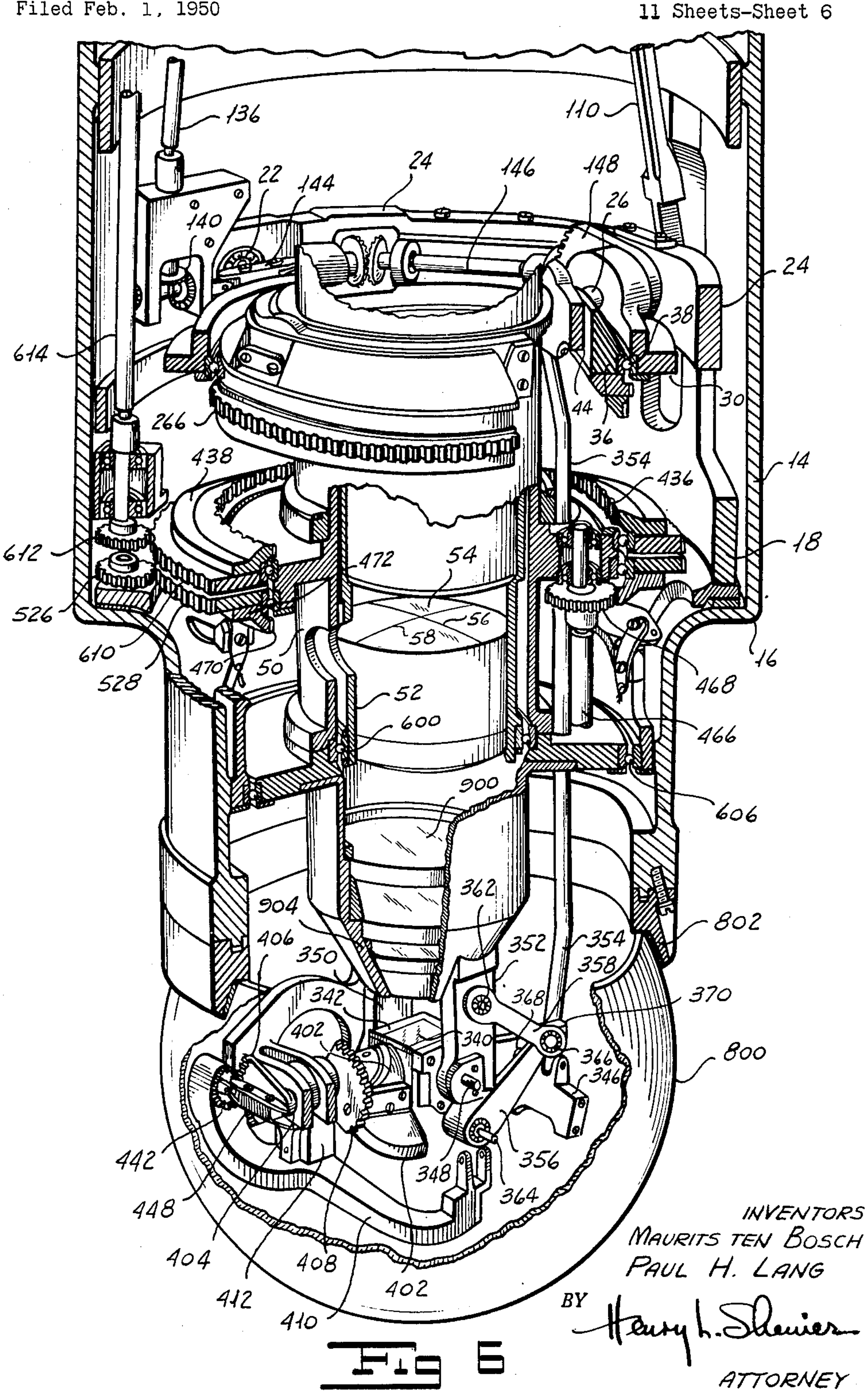
FIG. 6 is a view similar to FIG. 4 with additional parts broken away to show further features of construction.
Figure 7:
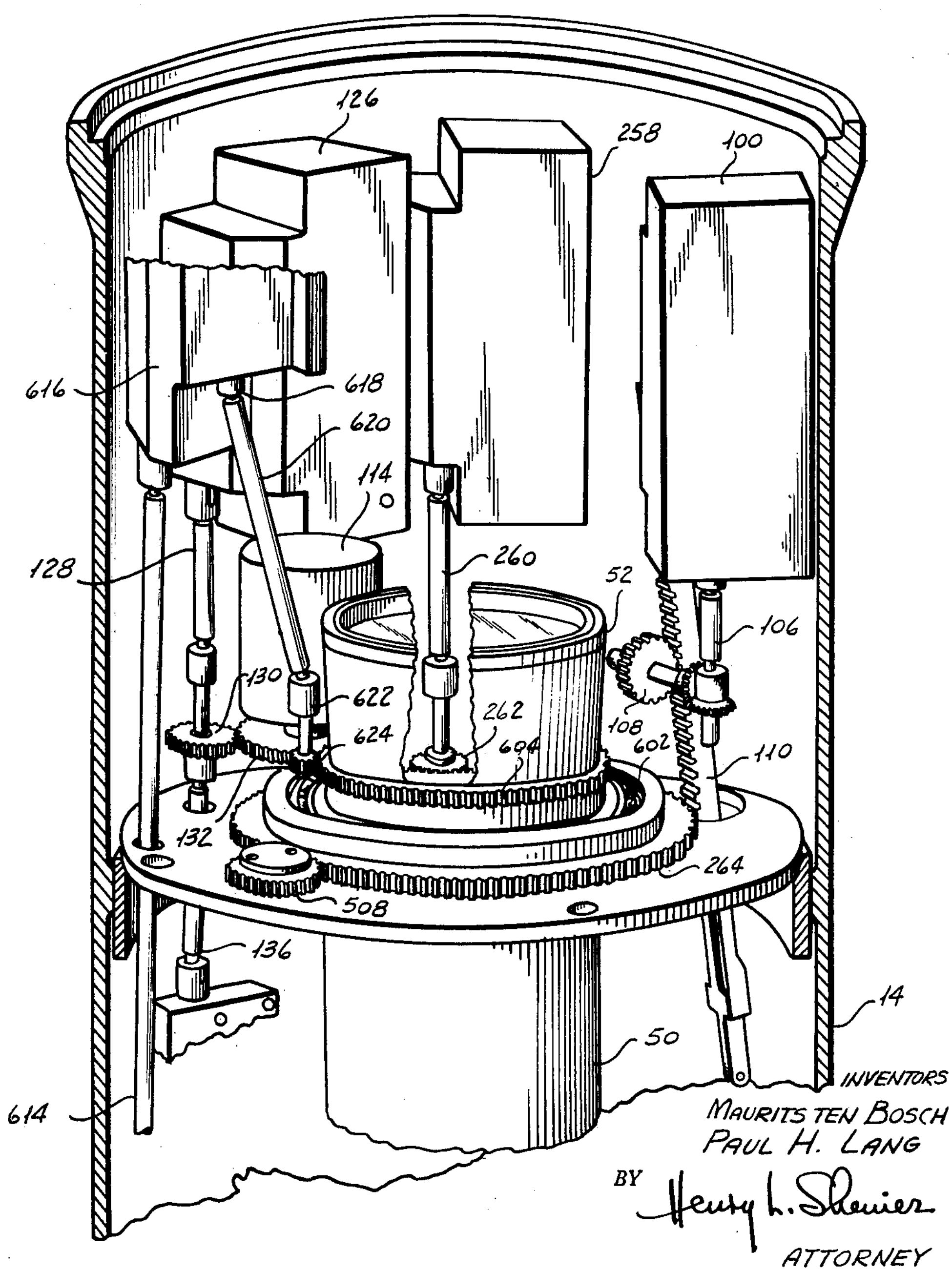
FIG. 7 is a view similar to FIG. 5 with further parts broken away to show additional details of the assembly.
Figures 8, 9:
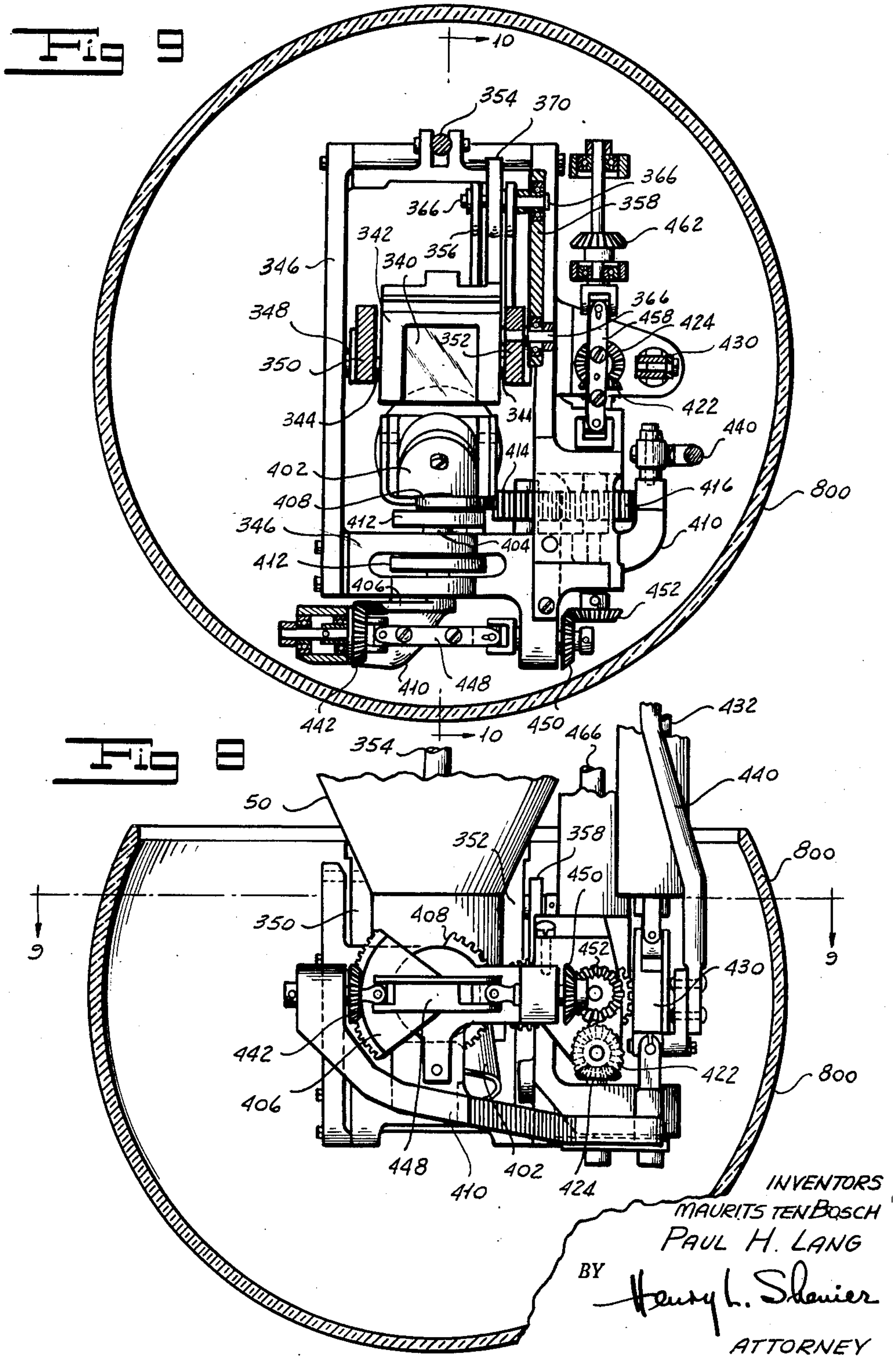
FIG. 8 is an elevation along the cross-level axis of the lower portion of the periscope viewed along the line 8—8 of FIG. 4.
FIG. 9 is a sectional view taken along the line 9—9 of FIG. 8.
Figure 10:
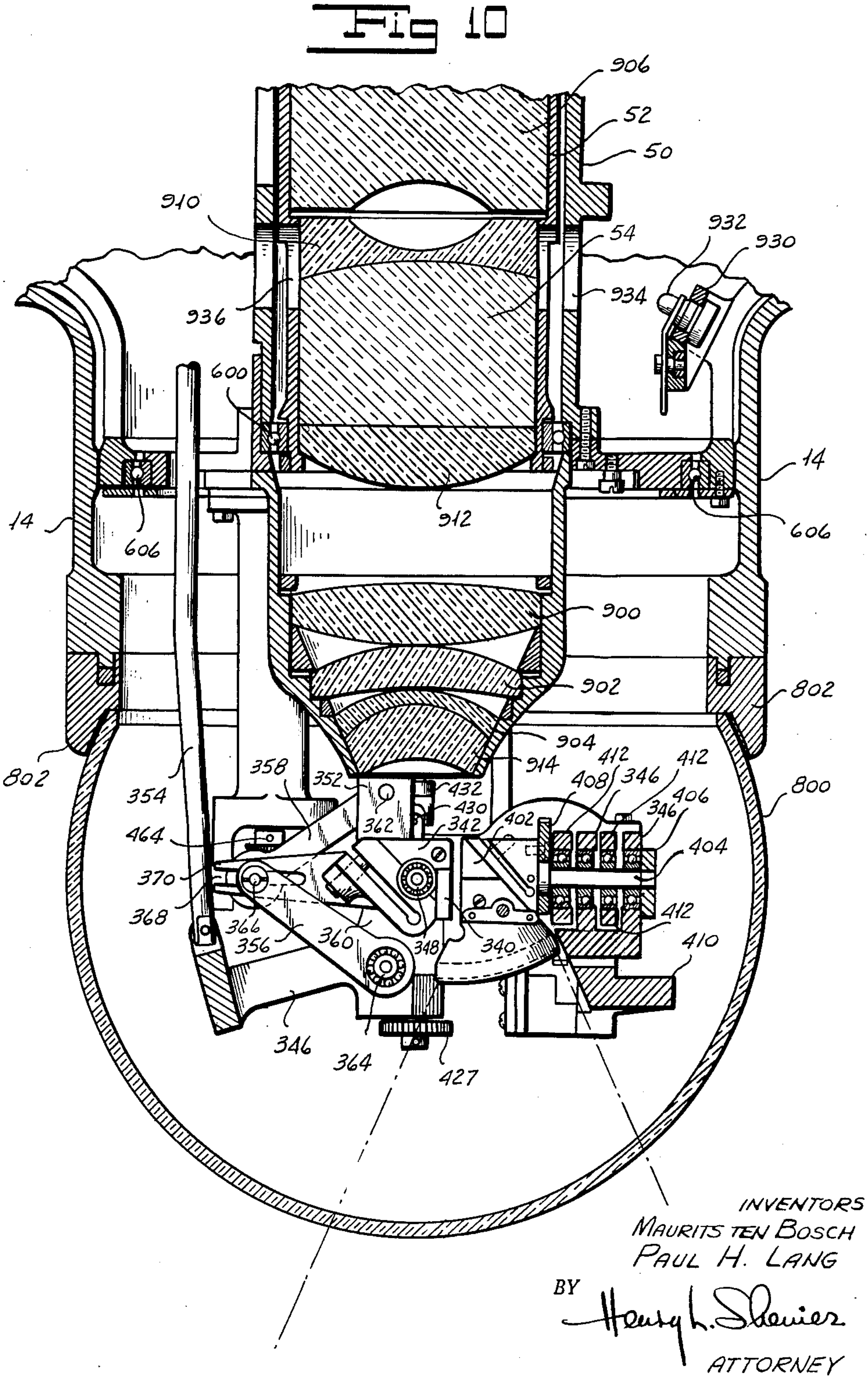
FIG. 10 is a sectional view taken along the level axis and viewed along the line 10—10 of FIG. 9.

The lower end of reticule tube 52 is mounted in a bearing 600 as can be seen by reference to FIGURES 6 and 10. The upper end of the reticule tube 52 is mounted for rotation in a bearing 602, as can be seen by reference to FIGURE 7. The upper and lower bearings which are carried by the periscope tube 50 permit the reticule tube to rotate. A gear 604 is secured to the reticule tube to enable the tube to be turned through a force applied to this gear. The periscope tube 50 is mounted for rotation adjacent its lower end in a bearing 606, as can be seen by reference to FIGURES 4, 6 and 10, and adjacent its upper end in a bearing 608, as can be seen by reference to FIGURE 11.

Ring ear 438 is provided with external teeth 610 which mesh with a gear 612 carried by a shaft 614, which is the input shaft to a torque amplifier 616. We have seen that the input to the torque amplifier represents rotation in azimuth of the line of sight due to rotation of the periscope tube and rotation of the line of sight due to level and to sight angle. The output of the torque amplifier 616 appears at the universal joint 618 which is connected to the shaft 620, which is in turn connected by universal joint 622 to a pinion 624 which meshes with the ring gear 604 carried by the reticule tube 52 as can be seen by reference to FIGURES 3 and 7. This construction will keep the crosshairs on the reticule tube aligned with the level and cross-level axes and will remove the apparent rotation of the target with respect to the crosshairs as the line of sight varies due to the different motions through which the aircraft is subjected. These motions include not only rolling, pitching and yawing, but changes in sight angle due to movement toward or away from the target and changes in sight angle due to changes in altitude. The variations of the direction of the target due to motion of the plane are likewise taken into consideration by the rate computer.

Referring now to FIGURE 11, the pitch ring 36 has an amplitude of motion indicated by the dotted lines in this figure. A flexible member 700 is secured to a spring 702, the other end of which is attached to the pitch ring 36. The upper end of the flexible member is connected to a drum 704 which is secured to a shaft 703 which is geared to the shaft 136. The arrangement is such that the pitch ring transmission system is loaded to remove backlash.

The lower end of the casing 14 projects out of the airplane and the prism assembly is protected by a spherical transparent globe 800 which is cemeted to a fitting 802 carried by the casing 14. The globe 800 is optically ground in the form of a perfect sphere so that no distortion will be produced by the transmission of the line of sight through the protecting optical glass globe 800. The globe furthermore seals the optical system and prevents the ingress of moisture which would condense on the optical elements 900, 902, 904, 906, 910, 912, and 914 which are shown in FIG. 10. The casing 14 carries a fixture 930 in which is secured an incandescent lamp 932 adapted to illuminate the reticule 54 through an opening 934 formed in periscope tube 50 and a registering opening 936 formed in the reticule tube 52. In this manner the reticule is illuminated showing the crosshairs clearly superimposed upon a view of the target.

In operation the flight gyroscope 60 is brought up to speed and the servomotors, synchros and amplifiers are energized. The azimuth gyroscope 170 is likewise brought up to speed and its synchros, amplifiers, and servomotors are energized. The rate computer into which the true air speed, the wind velocity and direction, the aircraft course, and the bearing of the target are fed, is set into operation. The torque amplifier is energized. The sight angle motor is energised and the altitude of the aircraft and the horizontal range to the target are fed into the sight angle computer to enable this instrument to compute sight angle. The line of sight is slued to the target by means of displacement knob 224, and one looking through the optical sighting system will see the target centered on the crosshairs of the reticule with the level axis apparently horizontal to the observer and the cross-level axis apparently vertical, that is, along the line of sight. As the plane pitches and rolls the level ring will remain parallel to the plane of the horizon and through the parallel motion linkages the prism 400 and frame 410 will be stabilized in a plane parallel to the horizon. The cross-level prism will be stabilized to perform rotation about the cross-level axis through half the angle of movement about the cross-level axis and thus stabilize the line of sight about the cross-level axis. The sight angle is fed to the level prism and thus maintains the line of sight on the target irrespective of changes in altitude of the aircraft and irrespective of variations in the horizontal range between the aircraft and the target. As the plane rotates about the level axis the level prism will be stabilized due to rotation of the level prism about the level axis governed by the parallel motion linkage to the level ring. It will be observed that when the line of sight does not coincide with the direction of flight of the aircraft, when the aircraft rolls two components of the roll will be automatically transferred by the co-ordinate transforming ring system of my invention, one to the level ring and one to the cross-level ring. Similarly, when the aircraft pitches, that is, rotates about the pitch axis, two components will be generated by the co-ordinate transformink ring system, and these will be reflected respectively in the level ring and in the cross-level ring. Furthermore, the inclination of the periscope vertical axis caused by rolling or pitching is not permitted to introduce an error into the azimuth, that is, introduce an error into the bearing of the target from the aircraft since the arrangement is such that the periscope tube is turned to an angle which may be greater than or less than the change in course of an aircraft through the compensating arrangement effected by connecting the azimuth synchro to be responsive to the rotary level ring which is stabilized in the plane parallel to the horizon. It is understood, of course, that the flight gyroscope 60 is provided with a suitable erecting mechanism to maintain the spin axis in the true vertical direction at all times.

The reticule tube is independently mounted from the periscope tube and this is stabilized to compensate for changes in azimuth and changes in sight angle as well as for rotation about the level axis.

It will be seen that we have accomplished the objects of our invention. We have provided apparatus for stabilizing optical sighting systems in which a periscope or other optical system is mounted on a vessel or aircraft for bodily movement therewith and rotatable in azimuth, in which a line of sight to the target will be maintained irrespective of the maneuvering of the aircraft or vessel and irrespective of rolling or pitching of the aircraft or vessel. We have provided an apparatus for stabilizing optical sighting systems by means of fixed gyroscopes along level and cross-level axes with respect to the line of sight in which the line of sight does not normally correspond to the direction of movement of the aircraft. We have provided apparatus for stabilizing optical sighting systems in which the optical elements are maintained along level and cross-level axes from a gyroscope without reorienting the gyroscope as the line of sight changes. We have provided apparatus for stabilizing optical sighting systems in which an azimuth gyroscope controls the orientation of the line of sight to indicate the true direction of the target irrespective of rolling or pitching of the target, and into which an elevation angle may be set directly. We have provided apparatus of stabilizing optical sighting systems in which a line of sight is established from a moving aircraft to a target and maintained irrespective of maneuvers of the aircraft both in attitude and direction as well as in altitude. We have provided a line of sight stabilized along cross-level and level axes as indicated by a reticule having crosshairs, in which the crosshairs are maintained in alignment with the level and cross-level axes irrespective of changes in course of the aircraft and irrespective of rotation of the aircraft about the pitch and roll axes, and in which the line of sight is stabilized along a direction which does not correspond to the direction of flight of the aircraft.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for stabilizing optical systems including in combination a gyroscope having two degrees of freedom, one around the roll axis of a craft and one around the pitch axis of a craft, a roll ring mounted on the craft remote from the gyroscope for rotation about an axis parallel to the roll axis, a pitch ring carried by the roll ring for rotation about an axis parallel to the pitch axis, telemetric means responsive to the relative movement of the gyroscope with respect to the craft about the roll axis for rotating the roll ring about its axis, telemetric means responsive to the relative movement of the gyroscope with respect to the craft about the pitch axis for rotating the pitch ring about its axis, a level ring rotatably carried by the pitch ring, an optical system having a housing, means for mounting said housing on the craft for rotation about an axis vertical to the craft, a cross-level ring, means for pivotally connecting said cross-level ring to the optical system housing for rotation about the cross-level axis, means for pivotally connecting said cross-level ring to said level ring for rotation about the level axis.

2. Apparatus for stabilizing optical systems including in combination a first gyroscope having two degrees of freedom, one around the roll axis of a craft and one around the pitch axis of a craft, a roll ring mounted on the craft remote from the gyroscope for rotation about an axis parallel to the roll axis, a pitch ring carried by the roll ring for rotation about an axis parallel to the pitch axis, telemetric means responsive to the relative movement of the gyroscope with respect to the craft about the roll axis for rotating the roll ring about its axis, telemetric means responsive to the relative movement of the gyroscope with respect to the craft about the pitch axis for rotating the pitch ring about its axis, a level ring rotatably carried by the pitch ring, an optical system having a housing, means for mounting said housing on the craft for rotation about an axis vertical to the craft, a cross-level ring, means for pivotally connecting said cross-level ring to the optical system housing for rotation about the cross-level axis, means for pivotally connecting said cross-level ring to said level ring for rotation about the level axis, a second gyroscope having two degrees of freedom, one of which is about a vertical axis and the other of which is about a horizontal axis, telemetric means responsive to relative movement of the second gyroscope with respect to the craft about a true vertical axis for rotating said optical system housing in azimuth whereby to rotate said level ring, and follow-up means responsive to the rotation of said level ring for controlling said telemetric means.

3. Apparatus as in claim 2 in which said telemetric means for rotating the roll ring comprises a first synchro having a rotor responsive to relative movement of said gyroscope with respect to the craft around the roll axis, a second synchro having a rotor and adapted to generate a signal as a function of the relative displacement of the rotor of said first synchro with respect to its stator, a servomotor responsive to said signal for rotating said roll ring about its axis, and means responsive to the movement of said roll ring for rotating the rotor of said second synchro in a direction to nullify the signal produced in said second synchro by the relative movement of the rotor of said first synchro.

4. Apparatus as in claim 2 in which said telemetric means for rotating the pitch ring comprises a first synchro having a rotor responsive to the relative movement of the craft with respect to the gyroscope around the pitch axis, a second synchro having a rotor and adapted to produce a signal as a function of the relative displacement of the rotor of said first synchro, a servomotor responsive to said signal for rotating the pitch ring about the pitch axis, and means responsive to the rotation of said servomotor for rotating the rotor of said second synchro in a direction to nullify the signal of said second synchro.

5. Apparatus as in claim 2 in which said telemetric means for rotating said optical system housing in azimuth comprises a first synchro having a rotor responsive to relative motion between the craft and said second gyroscope around a vertical axis, a second synchro having a rotor and adapted to generate a signal as a function of the relative displacement of the rotor of said first synchro with respect to its stator, and a servomotor responsive to said signal adapted to rotate the optical system housing, said follow-up means comprising means for rotating the rotor of said second synchro in a direction to nullify its signal.

6. Apparatus as in claim 2 in which said telemetric means for rotating said optical system housing an azimuth comprises a first synchro having a rotor responsive to relative motion between the craft and said second gyroscope around a vertical axis, a second synchro having a rotor and adapted to generate a signal as a function of the relative displacement of the rotor of said first synchro with respect to its stator, a servomotor responsive to said signal adapted to rotate the optical system housing, said follow-up means comprising means for rotating the rotor of said second synchro in a direction to nullify its signal, and means for manually modifying the relative position between the rotor and stator of said first synchro to slue said optical system housing to a desired orientation.

7. Apparatus as in claim 2 in which said telemetric means for rotating said optical system housing in azimuth comprises a first synchro having a rotor responsive to relative motion between the craft and said second gyroscope around a vertical axis, a second synchro having a rotor and adapted to generate a signal as a function of the relative displacement of the rotor of said first synchro with respect to its stator, a servomotor responsive to said signal adapted to rotate the optical system housing, said follow-up means comprising means for rotating the rotor of said second synchro in a direction to nullify its signal, and means responsive to the rate of change in bearing of the line of sight of the optical system for modifying the position of the rotor of said first synchro with respect to its stator.

8. Apparatus for stabilizing optical sighting systems including in combination a vertical housing for the optical sighting system, means for rotatably mounting said housing in an aircraft for rotation about a relatively vertical axis, a roll ring surrounding said housing for rotation about an axis parallel to the roll axis of the aircraft, a pitch ring carried by said roll ring for rotation about an axis parallel to the pitch axis of the aircraft, gyroscopic means for stabilizing said roll ring about the roll axis, gyroscopic means for stabilizing said pitch ring about the pitch axis, a level ring rotatably carried by said pitch ring, a cross-level ring pivotally secured to said housing for rotation about a cross-level axis, means for pivotally securing said cross-level ring to said level ring for rotation about an axis at right angles to the cross-level axis, a frame pivotally carried by the lower end of said housing for rotation about an axis parallel to the cross-level axis, a parallel motion linkage between the cross-level ring and said frame, a first prism, means for mounting said first prism for rotation about the frame axis, an angle halving linkage between said frame and said first prism, a second prism adapted to deflect the line of sight from said first prism through 90°, means for rotatably mounting said second prism for rotation about an axis parallel to the level axis, a bracket carried by said frame for rotation about the axis of rotation of said second prism, parallel motion linkage between said level ring and said bracket, and means responsive to the rotation of said bracket for rotating said second prism.

9. Apparatus as in claim 8 including in combination gyroscopic means stabilized in azimuth for rotating said housing as a function of the relative rotation between said gyroscope and the aircraft about an azimuth axis, and means responsive to the rotation of said level ring for controlling said stabilizing means.

10. Apparatus as in claim 8 including in combination means for generating a function of the sight angle between the aircraft and a given target, and means for modifying the rotation of said second prism in accordance with sight angle.

11. Apparatus as in claim 8 including in combination gyroscopic means stabilized in azimuth for rotating said housing as a function of the relative rotation between said gyroscope and the aircraft about an azimuth axis, means responsive to the rotation of said level ring for controlling said stabilizing means, means for generating a function of the sight angle between the aircraft and a given target, and means for modifying the rotation of said second prism in accordance with sight angle.

12. Apparatus as in claim 8 including in combination gyroscopic means stabilized in azimuth for rotating said housing as a function of the relative rotation between said gyroscope and the aircraft about an azimuth axis, means responsive to the rotation of said level ring for controlling said stabilizing means, means for generating a function of the sight angle between the aircraft and a given target, means for modifying the rotation of said second prism in accordance with sight angle, said optical system including a reticule tube, means for rotatably mounting said reticule tube independent of the rotation of said optical system housing, a torque amplifier for rotating said reticule tube, and means for controlling the input to said torque amplifier in response to the rotation of said second prism.

13. Apparatus as in claim 8 including in combination gyroscopic means stabilized in azimuth for rotating said housing as a function of the relative rotation between said gyroscope and the aircraft about an azimuth axis, means responsive to the rotation of said level ring for controlling said stabilizing means, means for generating a function of the sight angle between the aircraft and a given target, means for modifying the rotation of said second prism in accordance with sight angle, said optical system including a recticule tube, means for rotatably mounting said reticule tube independent of the rotation of said optical system housing, a torque amplifier for rotating said reticule tube, and means for controlling the input to said torque amplifier in response to the rotation of said optical system housing.

14. Apparatus as in claim 8 including in combination gyroscopic means stabilized in azimuth for rotating said housing as a function of the relative rotation between said gyroscope and the aircraft about an azimuth axis, means responsive to the rotation of said level ring for controlling said stabilizing means, means for generating a function of the sight angle between the aircraft and a given target, means for modifying the rotation of said second prism in accordance with sight angle, said optical system including a reticule tube, means for rotatably mounting said reticule tube independent of the rotation of said optical system housing, a torque amplifier for rotating said reticule tube, and means for controlling the input to said torque amplifier as a combined function of the rotation of said second prism about its axis and the rotation of said optical system housing.

15. Apparatus for stabilizing optical sighting systems including in combination a vertical housing for the optical sighting system, means for rotatably mounting said housing in an aircraft for rotation about a relatively vertical axis, a roll ring surrounding said housing for rotation about an axis parallel to the roll axis of the aircraft, a pitch ring carried by said roll ring for rotation about an axis parallel to the pitch axis of the aircraft, gyroscopic means for stabilizing said roll ring about the roll axis, gyroscopic means for stabilizing said pitch ring about the pitch axis, a level ring, means for rotatably mounting said level ring on said pitch ring, a cross-level ring, means for pivotally securing the cross-level ring to said housing for rotation about a cross-level axis, means for pivotally securing said cross-level ring to the level ring for rotation about the level axis, a frame, means for pivotally mounting said frame on the lower end of the housing for rotation about an axis parallel to the cross-level axis, a parallel motion linkage between the cross-level ring and said frame, a prism, means for mounting said prism on said frame for rotation about an axis parallel to the level axis, a bracket carried by said frame for rotation about the axis of rotation of said prism, parallel motion linkage between the level ring and said bracket and means responsive to the rotation of said bracket for rotating said prism.

16. Apparatus as in claim 15 including in combination means for generating a function of the sight angle between the aircraft and a given target, a differential, means for rotating one of said differential gears as a function of sight angle, means for rotating said optical system housing in azimuth, means responsive to the rotation of the optical system housing for rotating another gear of said differential, a ring gear positioned around said optical system housing, means responsive to the motion of the third gear of said differential for driving said ring gear and means responsive to the rotation of said ring gear for modifying the rotation of said prism under the influence of the rotation of said bracket.

17. Apparatus for stabilizing optical sighting systems including in combination a vertical housing for the optical sighting system, means for rotatably mounting said housing in an aircraft for rotation about a relatively vertical axis, a roll ring positioned around said housing for rotation about an axis parallel to the roll axis of the aircraft, a pitch ring carried by the roll ring for rotation about an axis parallel to the pitch axis of the aircraft, gyroscopic means for stabilizing said roll ring about the roll axis, gyroscopic means for stabilizing said pitch ring about the pitch axis, a level ring rotatably carried by the pitch ring, a cross-level ring pivotally secured to said housing for rotation about a cross-level axis, means for pivotally securing said cross-level ring to said level ring for rotation about the level axis, a frame, means for pivoting said frame to said housing for rotation about an axis parallel to the cross-level axis, parallel motion linkage between the cross-level ring and said frame, a prism, means for mounting said prism for rotation about the frame axis, and an angle halving linkage between said frame and said prism.

References Cited in the file of this patent

UNITED STATES PATENTS 1,290,858 Yoshida ---------------- Jan. 7, 1919
1,733,531 Dugan ---------------- Oct. 29, 1929

2,069,417 Murtagh et al. ---------- Feb. 2, 1937
2,339,508 Newell ---------------- Jan. 18, 1944
2,410,638 Davis et al. ------------- Nov. 5, 1946
2,462,925 Varian ----------------- Mar. 1, 1949
2,464,629 Young ---------------- Mar. 15, 1949
2,465,957 Dienstbach ------------ Mar. 29, 1949

FOREIGN PATENTS 226,163 Great Britain ----------- May 14, 1925